US008869210B2

(12) United States Patent
Shikata et al.

(10) Patent No.: US 8,869,210 B2
(45) Date of Patent: Oct. 21, 2014

(54) BROADCAST RECEIVING APPARATUS, CONTROL METHOD THEREOF, AND STORAGE MEDIUM

(75) Inventors: Yasushi Shikata, Tama (JP); Kazuna Maruyama, Fuchu (JP); Yoshikazu Shibamiya, Tokyo (JP); Kazuhiro Matsubayashi, Yokohama (JP); Koji Mito, Kawasaki (JP); Osamu Yonishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1747 days.

(21) Appl. No.: 11/846,032

(22) Filed: Aug. 28, 2007

(65) Prior Publication Data

US 2008/0060019 A1 Mar. 6, 2008

(30) Foreign Application Priority Data

Aug. 31, 2006 (JP) .................................. 2006-236761

(51) Int. Cl.
| | |
|---|---|
| H04N 5/455 | (2006.01) |
| H04N 21/434 | (2011.01) |
| H04N 5/445 | (2011.01) |
| H04N 21/422 | (2011.01) |
| H04N 21/488 | (2011.01) |
| H04N 21/478 | (2011.01) |
| H04N 21/431 | (2011.01) |
| H04N 21/47 | (2011.01) |

(52) U.S. Cl.
CPC ....... *H04N 5/44582* (2013.01); *H04N 21/4345* (2013.01); *H04N 21/478* (2013.01); *H04N 21/42204* (2013.01); *H04N 21/4882* (2013.01); *H04N 21/4316* (2013.01); *H04N 21/47* (2013.01)

USPC .................. 725/56; 725/40; 725/52; 348/734

(58) Field of Classification Search
CPC ......... H04N 5/50; H04N 5/45; H04N 21/482; H04N 5/44543; H04N 5/44513
USPC ........ 725/38, 40, 48–49, 52, 56–57; 348/731, 348/705, 706
See application file for complete search history.

(56) References Cited

U.S. PATENT DOCUMENTS

| | | | | | |
|---|---|---|---|---|---|
| 5,583,560 | A | * | 12/1996 | Florin et al. ..................... | 725/40 |
| 6,359,580 | B1 | * | 3/2002 | Morrison ...................... | 348/731 |
| 6,766,526 | B1 | * | 7/2004 | Ellis ............................... | 725/57 |
| 7,756,497 | B2 | * | 7/2010 | Skeie et al. ................ | 455/185.1 |
| 2003/0233653 | A1 | * | 12/2003 | Hwang et al. .................. | 725/38 |

FOREIGN PATENT DOCUMENTS

| | | |
|---|---|---|
| JP | 2001-008117 A | 1/2001 |
| JP | 2002-176592 A | 6/2002 |
| JP | 2005-142827 A | 6/2005 |

* cited by examiner

*Primary Examiner* — Mark D Featherstone
*Assistant Examiner* — Anthony Bantamoi
(74) *Attorney, Agent, or Firm* — Canon USA, Inc. IP Division

(57) ABSTRACT

A broadcast receiving apparatus and method for controlling the apparatus includes selecting a channel from a plurality of channels included in a broadcast signal, an outputting channel selection information specifying a selected channel, outputting video of the selected channel to a display device, outputting channel information related to the selected channel to the display device, and controlling selection of the channel and outputting of the channel information based on the outputted channel selection information specifying a selected channel and a predetermined condition.

15 Claims, 11 Drawing Sheets

F I G. 3

| | Channel Info 1 (CHANNEL SELECTION ORDER : 1) | Channel Info 2 (CHANNEL SELECTION ORDER : 2) | Channel Info 3 (CHANNEL SELECTION ORDER : 3) | REMOTE CONTROLLER CODE |
|---|---|---|---|---|
| BROADCAST TYPE | BS | TERRESTRIAL D | CS | 04 |
| Service_ID | 141 | 041 | 257 | |
| BROADCAST TYPE | BS | TERRESTRIAL D | CS | 05 |
| Service_ID | 151 | 051 | 256 | |
| BROADCAST TYPE | BS | TERRESTRIAL D | CS | 06 |
| Service_ID | 161 | 061 | 301 | |
| BROADCAST TYPE | ... | ... | ... | ... |
| Service_ID | | | | |

BROADCAST RECEIVING APPARATUS, CONTROL METHOD THEREOF, AND STORAGE MEDIUM

BACKGROUND OF THE INVENTION

1. Field of the Invention

The present invention relates to a broadcast receiving apparatus, a control method of a broadcast receiving apparatus, and a storage medium, and particularly relates to a technique for selecting channels in a broadcast receiving apparatus.

2. Description of the Related Art

Broadcast receiving apparatuses, such as television receivers, recording devices that include television tuners, etc., generally have a function for outputting and displaying, in a display device, information related to a selected channel in response to a channel selection operation. Here, "display device" refers to a display portion of the television receiver. Furthermore, "information related to a selected channel" refers to, for example, the channel number of the selected channel, the name of the program currently being broadcasted, the broadcasting time, program attributes, etc. Display of information related to the selected channel shall be called "banner display" hereinafter. The banner display assists a user in understanding the outline of the currently selected program.

The banner display is also displayed in the case where a dedicated key (a banner display key) provided in the remote controller of the broadcast receiving apparatus is operated. The banner display is also displayed in the case where the currently selected channel is selected once again, or in other words, the case where the number key associated with the currently selected channel is operated. For example, the banner display of a Broadcasting Satellite (BS) channel 141 (BS141) can be carried out by the user depressing the number key (for example, the "4" key) associated with BS141 while viewing BS141.

In addition, there are also broadcast receiving apparatuses in which plural channels are assigned to each number key of the remote controller, and the plural channels assigned to a particular number key are cyclically selected in order with each depression of that number key. Such cyclical channel selection, carried out by depressing the same key plural times, shall be called "toggle channel selection" hereinafter.

FIG. 11 is a diagram illustrating an example of screen transition in a display device at the time of toggle channel selection. In the example, three channels are assumed to be assigned to the number key "4": BS 141, terrestrial digital 041, and Communication Satellite (CS) 257. When the user depresses the number key "4" plural times while viewing a certain channel (for example, BS103), the channels switch in order from BS141, to terrestrial digital 041, to CS257, and back to BS141, and so on. By using toggle channel selection, the number keys, which are limited in number, can be used efficiently in an environment in which there are many channels. Furthermore, toggle channel selection can also be used as a method for switching among types of broadcast format, e.g., BS, CS, terrestrial digital, etc., which have increased in recent years.

The techniques disclosed in Japanese Patent Laid-Open No. 2001-8117 and Japanese Patent Laid-Open No. 2002-176592 are known as conventional techniques regarding toggle channel selection. Japanese Patent Laid-Open No. 2001-8117 discloses a toggle channel selection method in which a broadcast station (provider) key is provided in a remote controller, and when the key is manipulated plural times, different channels from the same broadcast station are selected in order. Japanese Patent Laid-Open No. 2002-176592 discloses a method for carrying out toggle channel selection in accordance with priority channels, a channel order, and the like specified by the broadcast station.

According to the toggle channel selection methods disclosed in Japanese Patent Laid-Open No. 2001-8117 and Japanese Patent Laid-Open No. 2002-176592, when the number key corresponding to the currently selected channel (or the broadcast station key) is depressed, the next channel that is assigned to that key is selected. Therefore, there is a problem that carrying out the banner display by depressing the number key that corresponds to the currently selected channel, which was conventionally possible, is no longer possible.

The present invention has been conceived in light of this situation, and it is a characteristic thereof to provide a technique that improves convenience for the user by causing a broadcast receiving apparatus to selectively execute channel information display and channel selection.

SUMMARY OF THE INVENTION

According to an aspect of the present invention, a broadcast receiving apparatus includes a selection unit configured to select a channel from a plurality of channels included in a broadcast signal, an operation unit configured to output channel selection information specifying the channel selected by the selection unit, a first output unit configured to output video of the channel selected by the selection unit to a display device, a second output unit configured to output channel information related to the channel selected by the selection unit to the display device, and a control unit configured to control the selection unit and the second output unit based on the channel selection information output from the operation unit and a predetermined condition, wherein when channel selection information associated with the channel currently selected by the selection unit is output from the operation unit, the control unit determines, based on the predetermined condition, whether to cause the selection unit to select one other channel that has been assigned in advance in the channel selection information or to cause the second output unit to output the channel information related to the channel currently selected.

Further features of the present invention will become apparent from the following description of exemplary embodiments with reference to the attached drawings.

BRIEF DESCRIPTION OF THE DRAWINGS

FIG. 3 is a diagram illustrating an example of a channel selection table stored in a channel selection table storage unit of the digital television.

DESCRIPTION OF THE EMBODIMENTS

Exemplary embodiments of the present invention will now be described with reference to attached drawings.

It should be noted that the technical scope of the present invention is defined by claims, and is not limited by the embodiments described below. In addition, all combinations of the features described in the embodiments are not always indispensable for the present invention.

Furthermore, in the embodiments described below, a television receiver compliant with digital broadcasting such as BS digital broadcasting, CS digital broadcasting, terrestrial digital broadcasting, etc. (called a "digital television" hereinafter) is used as an example of the broadcast receiving apparatus. However, a television receiver compliant with, for example, only analog broadcasting can also be applied in the embodiments.

Moreover, apart from a television receiver that is an integration of display device and tuner, broadcast receiving apparatuses such as, for example, a recording device that includes an analog or digital television tuner, can also be applied in the embodiments. In such case, a user can view a broadcasted program by connecting an external display device (for example, a television receiver, display monitor, or the like) to the recording device. Additionally, "television receiver" includes devices having the same functions as a television receiver, such as a personal computer, set-top box (STB), mobile phone, or the like that have a television tuner. [First Embodiment]

Figure 1:
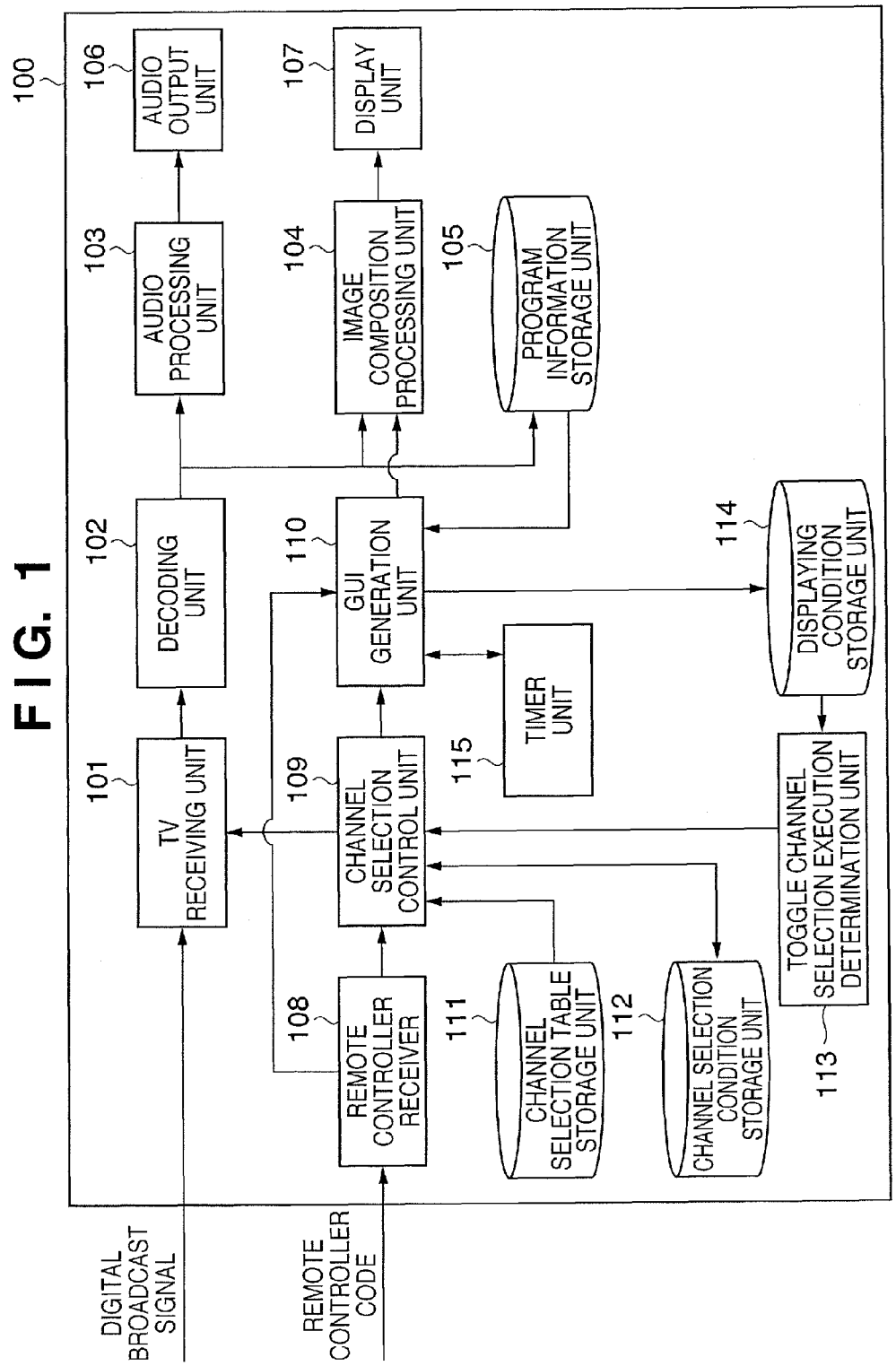
FIG. 1 is a block diagram illustrating a schematic configuration of a digital television according to a first embodiment of the present invention.
Figure 2:
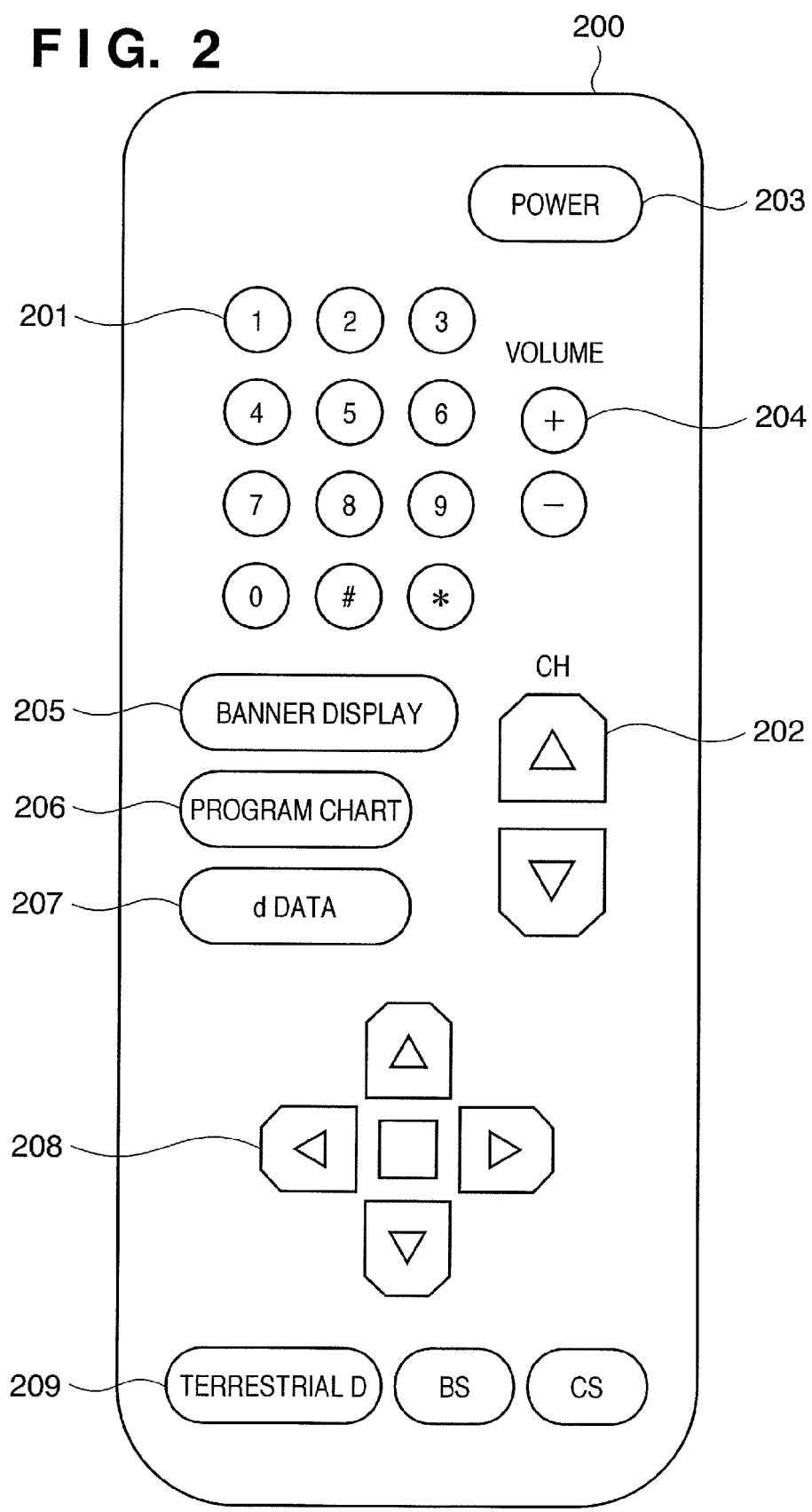
FIG. 2 is a diagram illustrating a remote controller for providing an instruction of channel selection to the digital television.

FIG. 1 is a block diagram illustrating a schematic configuration of a digital television 100 according to a first exemplary embodiment of the present invention. FIG. 2 is a diagram illustrating a remote controller 200 for providing an instruction of channel selection to the digital television 100. When a key of the remote controller 200 is depressed, infrared light, including a remote controller code indicating the depressed key, is transmitted from a transmitting unit (not shown). The infrared light output by the remote controller is received by a remote controller receiver 108 (described later) of the digital television 100.

The remote controller 200 includes number keys 201, a channel selection up/down key 202, a power key 203, a volume adjustment up/down key 204, and a banner display key 205 for banner display. The remote controller 200 also includes a program chart key 206 for displaying a program chart, a d data key 207 for data broadcast display, arrow keys 208, and broadcast type switch keys 209 for switching between broadcast types such as terrestrial digital, BS, CS, etc.

The digital television 100 includes a TV receiving unit 101, a decoding unit 102, an audio processing unit 103, an image composition processing unit 104, a program information storage unit 105, an audio output unit 106, a display unit 107, and the remote controller receiver 108. The digital television 100 also includes a channel selection control unit 109, a Graphical User Interface (GUI) generation unit 110, and a channel selection table storage unit 111. Moreover, the digital television 100 also includes a channel selection condition storage unit 112, a toggle channel selection execution determination unit 113, a displaying condition storage unit 114, and a timer unit 115.

The TV receiving unit 101 includes a television tuner, where the TV receiving unit 101 receives a digital broadcast signal and performs demodulation processing thereon. The channel selection control unit 109 selects the tuner used by the TV receiving unit 101 based on the broadcast type of the selected channel. The TV receiving unit 101 outputs transport stream data (called TS data hereinafter), in which video, audio, etc. are multiplexed to the decoding unit 102.

The decoding unit 102 demultiplexes the TS data provided by the TV receiving unit 101 into video data (image data), audio data, PSI/SI data, etc., and decodes the respective data. "PSI/SI data" is an abbreviation of "Program-Specific Information/Service Information data", and hereinafter is referred to as "program information data". The decoded video data is input into the image composition processing unit 104. The decoded audio data is input into the audio processing unit 103. In addition, the decoded program information data is input into the program information storage unit 105, which is a non-volatile or volatile memory, and is stored temporarily therein. Program-related information used in banner display and the like is included in the program information data.

The audio processing unit 103 performs audio processing regarding sound quality, acoustic effects, etc. on the audio data decoded by the decoding unit 102, D/A conversion and amplification processing on the audio data, and outputs the audio data to the audio output unit 106.

The remote controller receiver 108 receives remote controller codes from the remote controller 200. The remote controller receiver 108 generally receives remote controller codes via an infrared light input port (not shown). The received remote controller codes are transferred to the channel selection control unit 109 or the GUI generation unit 110 depending on the value of a particular code and the condition of the digital television 100.

For example, in the case where the remote controller code indicates that one of the number keys 201 has been depressed, the remote controller receiver 108 transfers the received remote controller code to the channel selection control unit 109. In this case, the remote controller code is handled as identification information indicating the selected channel (channel selection information). The channel selection control unit 109 performs channel selection control in accordance with the transferred remote controller code.

On the other hand, in the case where the remote controller code is related to the GUI for displaying detailed information about the program, in other words, the remote controller code is derived from the banner display key 205 being depressed, the remote controller receiver 108 transfers the received remote controller code to the GUI generation unit 110. The GUI generation unit 110 generates a GUI displaying detailed information of the program currently being broadcasted.

The channel selection table storage unit 111 stores a channel selection table in which the remote controller code and the channel selected thereby are associated. In other words, the channel selection table indicates an association between the number keys 201 of the remote controller 200 and the channels respectively assigned thereto. The channel selection table can be changed by user instructions as needed.

The channel selection condition storage unit 112 stores information of the currently selected channel. This information is updated by the channel selection control unit 109 each time a channel is selected. The channel selection table storage unit 111 and channel selection condition storage unit 112 are both non-volatile or volatile memories. These, along with the program information storage unit 105 and the displaying condition storage unit 114 described below, may exist within the same memory.

The channel selection control unit 109 specifies the channel to be selected from the broadcast signal. Specifying the channel is based on determination results of the toggle channel selection execution determination unit 113, the remote controller code from the remote controller receiver 108, the channel selection table stored in the channel selection table storage unit 111, and the information of the currently selected channel stored in the channel selection condition storage unit 112. Then, the channel selection control unit 109 sets the tuner of the TV receiving unit 101 so that the channel to be selected is output from the TV receiving unit 101. The channel selection control unit 109 also makes instructions to the GUI generation unit 110 regarding the generation of the banner display for the selected channel.

The GUI generation unit 110 generates a GUI for banner display in accordance with the remote controller code transferred from the remote controller receiver 108 or the banner display generation instructions made by the channel selection control unit 109. In the case where information regarding the program is necessary for GUI generation, the GUI generation unit 110 accesses the program information storage unit 105 and obtains the program information of the corresponding program. The generated GUI is sent to the image composition processing unit 104 in a form including control information specifying the position, size, etc. at which to be displayed in the video.

The toggle channel selection execution determination unit 113 determines whether or not the channel selection control unit 109 is to perform toggle channel selection, based on information of the banner display condition (display or no display) stored in the displaying condition storage unit 114.

The displaying condition storage unit 114 stores a flag indicating the banner display condition (display or no display). This flag is updated by the GUI generation unit 110 that generates the banner display. The GUI generation unit 110 causes the banner display to be displayed after channel selection, and then causes the banner display not to be displayed after a predetermined amount of time has elapsed. Accordingly, the GUI generation unit 110 updates the flag in the displaying condition storage unit 114 at the respective timings at which the banner display is displayed and not displayed. The banner display is also displayed in the case where the banner display key 205 of the remote controller 200 is depressed, the case where toggle channel selection has not been admitted by the toggle channel selection execution determination unit 113, etc.

The timer unit 115 measures the time elapsed from a predetermined timing, and notifies the GUI generation unit 110 of the elapsed time. The GUI generation unit 110 uses the timer unit 115 to confirm the timing at which to cause the banner display not to be displayed. For example, the timer unit 115 commences measurement when the banner display is displayed, and after a predetermined amount of time has elapsed, notifies the GUI generation unit 110 that the predetermined amount of time has elapsed. Upon being notified thereof, the GUI generation unit 110 stops generation of the banner display and stops output of the banner display to the image composition processing unit 104, and ends the banner display.

Figure 11:
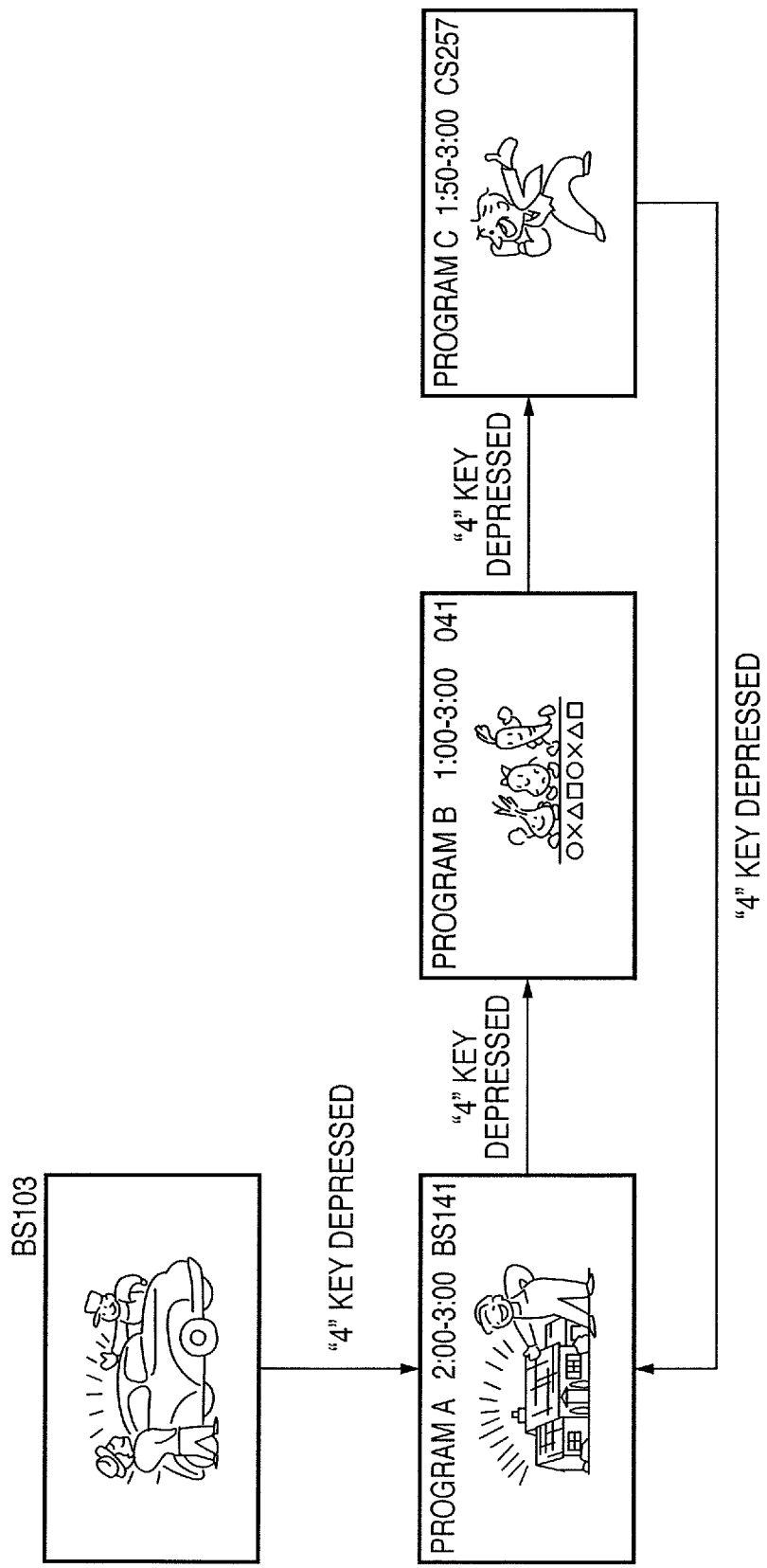
FIG. 11 is a diagram illustrating an example of screen transition in a display device at the time of toggle channel selection.

The image composition processing unit 104 synthesizes the video data decoded by the decoding unit 102 with the GUI generated by the GUI generation unit 110. The image composition processing unit 104 also performs image processing such as noise reduction, scaling processing, tone processing, edge enhancement, etc. on the data before and after the synthesis. The image composition processing unit 104 outputs the synthesized data to the display unit 107. Accordingly, a screen such as that illustrated in, for example, FIG. 11 is displayed in the display unit 107. The image composition processing unit 104 may output the synthesized data to an external monitor rather than to the display unit 107.

FIG. 3 is a diagram illustrating an example of the channel selection table stored in the channel selection table storage unit 111. The channel selection table holds plural pieces of channel information, i.e., a set of the broadcast type and the Service_ID, for each remote controller code. For example, (BS, 141), (terrestrial D (terrestrial digital), 041), and (CS, 257) are assigned as channel information to the remote controller code "04". That is, the "4" key of the number keys 201 of the remote controller 200).

In addition, a channel selection order is given to each piece of channel information. In FIG. 3, BS 141 is number 1, terrestrial D 041 is number 2, and CS 257 is number 3. Accordingly, in the case where the remote controller receiver 108 consecutively receives the remote controller code "04" and the toggle channel selection execution determination unit 113 has admitted the execution of toggle channel selection, channels are selected in the order from BS 141, to terrestrial D 041, to CS 257, back to BS 141, and so on, in accordance with the channel selection order.

As described above, the channel selection table holds plural pieces of identification information associated with the respective plural channels, and a channel selection order is set for the plural channels associated with the respective pieces of identification information.

Figure 4:
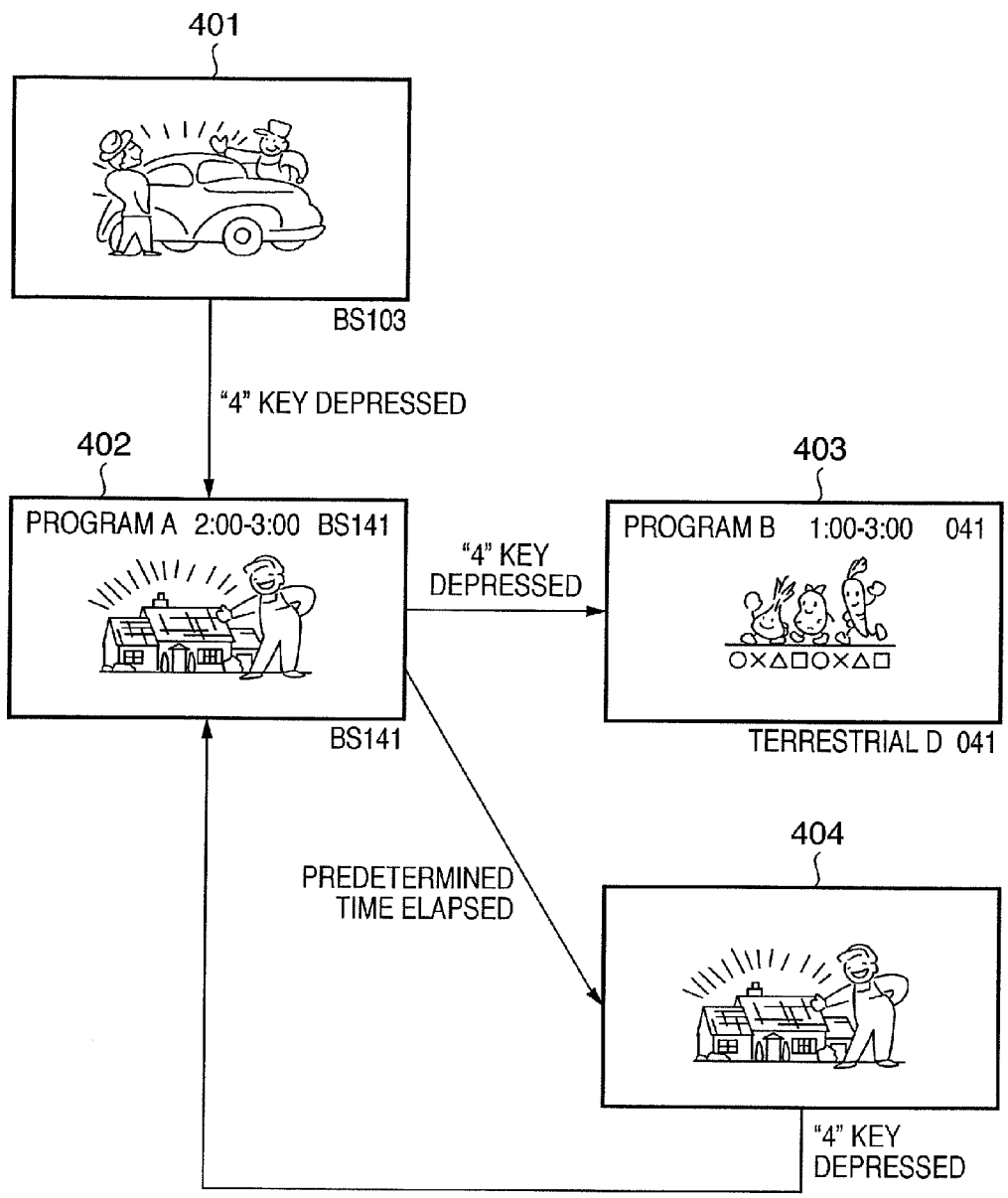
FIG. 4 is a diagram illustrating an example of screen transition in a display unit of the digital television according to the first embodiment.

FIG. 4 is a diagram illustrating an example of screen transition in the display unit 107 according to the first embodiment. Initially, the user is assumed to be viewing BS 103, as indicated by a screen 401. Here, when the user depresses the "4" key of the number keys 201, the digital television 100 selects the channel BS 141 (screen 402) in accordance with the channel selection table of FIG. 3.

As indicated by the screen 402, a banner display containing "Program A 2:00-3:00 BS 141", which is a banner display regarding the program currently being broadcasted on the selected channel, is displayed simultaneously with the channel selection. In this example, the program name, broadcasting time, and channel number are displayed as the banner display, but the banner display is not limited thereto. For example, information of the video format, information of the audio mode (stereo or monaural), etc. may be displayed. This banner display automatically disappears after a predetermined amount of time elapses (screen 404).

However, when the user depresses the "4" key of the number keys 201 while in the state indicated by screen 402, the digital television 100 performs toggle channel selection in accordance with the channel selection table of FIG. 3. As a result, the terrestrial D 041 channel, which is second in the channel selection order, is selected (screen 403).

In addition, in the case where the user depresses the "4" key of the number keys 201 after the banner display has disappeared, as indicated in the screen 404, the digital television 100 does not perform toggle channel selection, but rather displays the banner display regarding the currently selected channel, i.e., the display changes from the screen 404 to the screen 402. Thereafter, the digital television 100 performs toggle channel selection or banner display based on the condition of the banner display each time the number key assigned to the currently selected channel is depressed.

Figure 5:
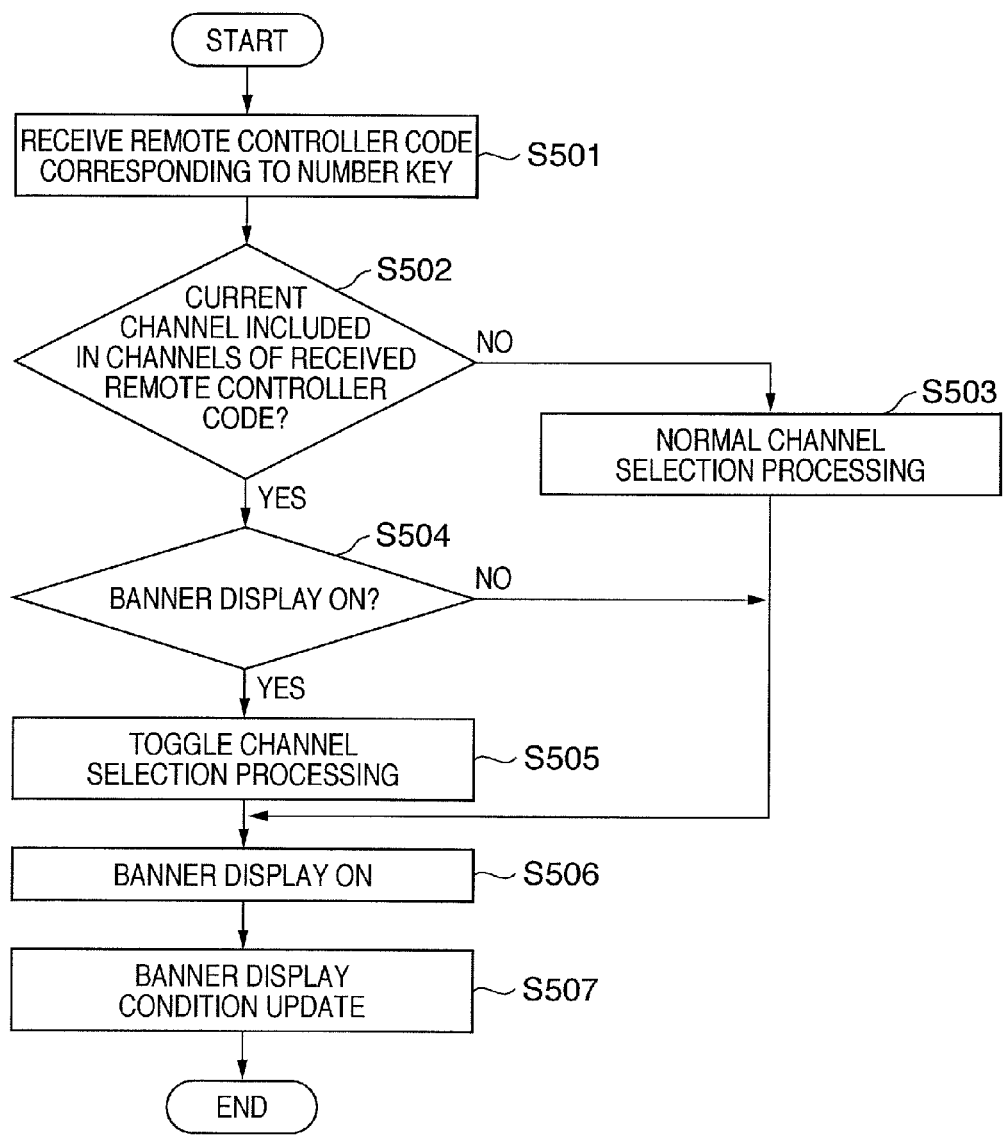
FIG. 5 is a flowchart illustrating a channel selection processing flow in the digital television according to the first embodiment.

FIG. 5 is a flowchart illustrating a channel selection processing flow in the digital television 100 according to the first embodiment.

In step S501, the remote controller receiver 108 receives a remote controller code corresponding to the number keys 201 from the remote controller 200, and transfers the remote controller code to the channel selection control unit 109.

In step S502, the channel selection control unit 109 determines whether the currently selected channel is included in the plurality of channels corresponding to the received remote controller code (refer to FIG. 3). In other words, the channel selection control unit 109 determines whether the remote controller code assigned to the currently selected channel is the same as the received remote controller code. In the case where the channel is included, that is, the code is the same, the procedure proceeds to step S504. In the case where the channel is not included, that is, the code is different, the procedure proceeds to step S503.

The channel selection control unit 109 accesses the channel selection condition storage unit 112 and obtains the broadcast type and Service_ID of the currently selected channel. The Service_ID is information with a length of 16 bits included in a Service Description Table (SDT), an Event Information Table (EIT), etc., which are SI data, and corresponds to each channel number.

Next, the channel selection control unit 109 accesses the channel selection table storage unit 111 and obtains the remote controller code corresponding to the currently selected channel (e.g., in the case where CS256 is the selected channel, the remote controller code "05" is obtained (refer to FIG. 3)). Then, the channel selection control unit 109 determines whether the remote controller code of the currently selected channel and the remote controller code received by the remote controller receiver 108 match. Note that the channel selection condition storage unit 112 may store the remote controller code of the currently selected channel. In such a case, the channel selection control unit 109 can access the channel selection condition storage unit 112 and obtain the remote controller code of the currently selected channel.

In step S503, the channel selection control unit 109 carries out normal channel selection processing, which corresponds to the transition from screen 401 to screen 402 in FIG. 4. More specifically, the channel selection control unit 109 obtains the channel selection table from the channel selection table storage unit 111. Then, in accordance with the channel selection table, the channel selection control unit 109 specifies the channel to be selected based on the remote controller code received in step S501 and the broadcast type of the currently selected channel obtained in step S502. The channel selection control unit 109 changes the setting of the tuner of the TV receiving unit 101 so that the specified channel is selected. The TV receiving unit 101 regenerates the TS from the broadcast signal in which the selected channel is included, and passes the TS to the decoding unit 102 in the subsequent stage.

In step S504, the toggle channel selection execution determination unit 113 determines whether a predetermined condition is met. In the present embodiment, the toggle channel selection execution determination unit 113 accesses the displaying condition storage unit 114 and determines whether the banner display is currently being displayed. In the case where the banner display is being displayed, toggle channel selection execution is possible, and the procedure proceeds to step S505. In the case where the banner display is not being displayed, toggle channel selection execution is not possible, and the procedure proceeds to step S506.

In step S505, the channel selection control unit 109 executes toggle channel selection. More specifically, the channel selection control unit 109 specifies the channel to be selected next in accordance with the channel selection table obtained in step S502. Then, the channel selection control unit 109 changes the setting of the tuner of the TV receiving unit 101 so that the specified channel is selected.

In step S506, the channel selection control unit 109 instructs the GUI generation unit 110 to generate the banner display for the currently selected program. Upon receiving the generation instruction, the GUI generation unit 110 obtains the information regarding the currently selected program from the program information storage unit 105, and generates a banner display GUI. The generated GUI is sent to the image composition processing unit 104, where it is synthesized with the video data, and is then displayed in the display unit 107.

It should be noted that the processing of step S506 is executed both in the case where the banner display is displayed and in the case where the banner display is not displayed in step S504. In other words, in the case where the banner display is being displayed, toggle channel selection is executed, and the banner display of the channel after channel selection is displayed (this corresponds to the transition from screen 402 to screen 403 shown in FIG. 4).

On the other hand, in the case where the banner display is not being displayed, toggle channel selection is not executed, and only display of the banner display is executed (this corresponds to the transition from screen 404 to screen 402 shown in FIG. 4). However, it does not matter whether the banner display is displayed after toggle channel selection. Per the present embodiment, the banner display and the toggle channel selection are executed selectively.

In step S507, the GUI generation unit 110 updates the flag stored in the displaying condition storage unit 114 to indicate that the banner display is in the "display" condition. At the same time, the GUI generation unit 110 instructs the timer unit 115 to commence measurement. When a predetermined amount of time has elapsed, the timer unit 115 notifies the GUI generation unit 110 of the time elapse. Having been notified thereof, the GUI generation unit 110 causes the banner display not to be displayed, and updates the flag stored by the displaying condition storage unit 114 to indicate that the banner display is in the "no display" condition.

As described above, according to the present embodiment, upon receiving a remote controller code, the digital television 100 determines whether the remote controller code corresponding to the currently selected channel and the received remote controller code match. In the case where the codes match, when the banner display is being displayed, toggle channel selection execution is carried out, and when the banner display is not being displayed, the banner display is displayed.

As a result, a user is able to control the broadcast receiving apparatus to selectively execute banner display and toggle channel selection, thereby increasing the convenience for the user. The user is easily able to understand which of the banner display and the toggle channel selection will be executed when a number key of the remote controller is depressed simply by confirming the presence/absence of the banner display.

Note that in the present embodiment, when following the channel selection table in FIG. 3, toggle channel selection is accompanied by a switch in broadcast type. However, it should be noted that the present invention is applicable even with toggle channel selection not accompanied by a switch in broadcast type. In such a case, for example, terrestrial D 021, terrestrial D 022, and terrestrial D 023 channels may be associated with the remote controller code "4" in the channel selection table of FIG. 3.

[Second Embodiment]

In the first embodiment, the digital television selectively executes the banner display and the toggle channel selection based on the presence/absence of the banner display. In a second embodiment, the digital television selectively executes the banner display and the toggle channel selection based on the amount of time that has elapsed following the channel selection, instead of the presence/absence of the banner display.

Note that in the present embodiment, the configuration of the remote controller 200 is the same as in the first embodiment, and therefore descriptions thereof shall be omitted herein.

Figure 6:
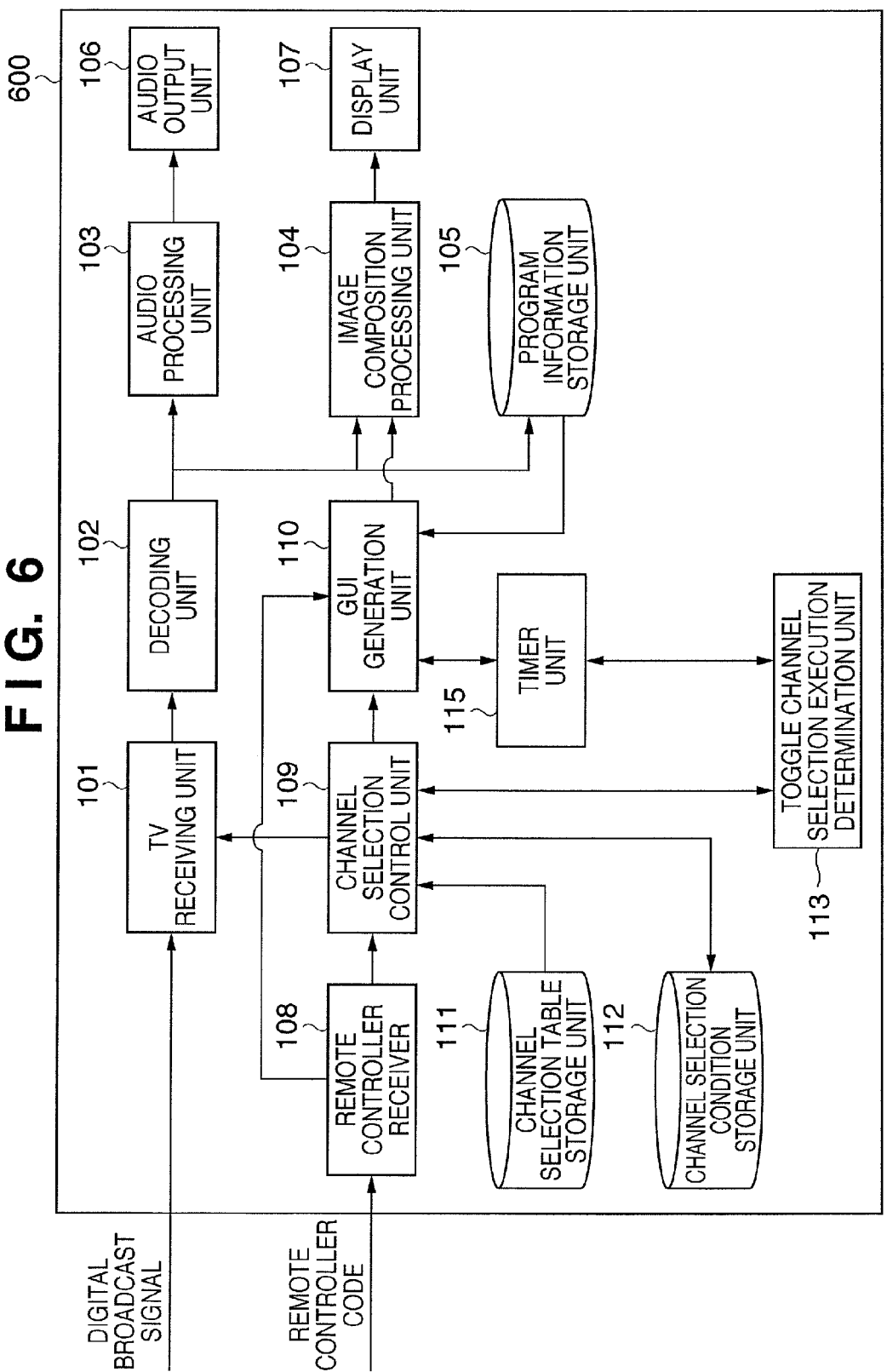
FIG. 6 is a block diagram illustrating a schematic configuration of a digital television according to a second embodiment of the present invention.

FIG. 6 is a block diagram illustrating a schematic configuration of a digital television 600 according to the second embodiment. The digital television 600 has a configuration identical to the digital television 100 illustrated in FIG. 1, except that the displaying condition storage unit 114 has been removed. The configuration is also such that the timer unit 115 notifies the toggle channel selection execution determination unit 113, as well as the GUI generation unit 110, of the elapsed time.

Figure 7:
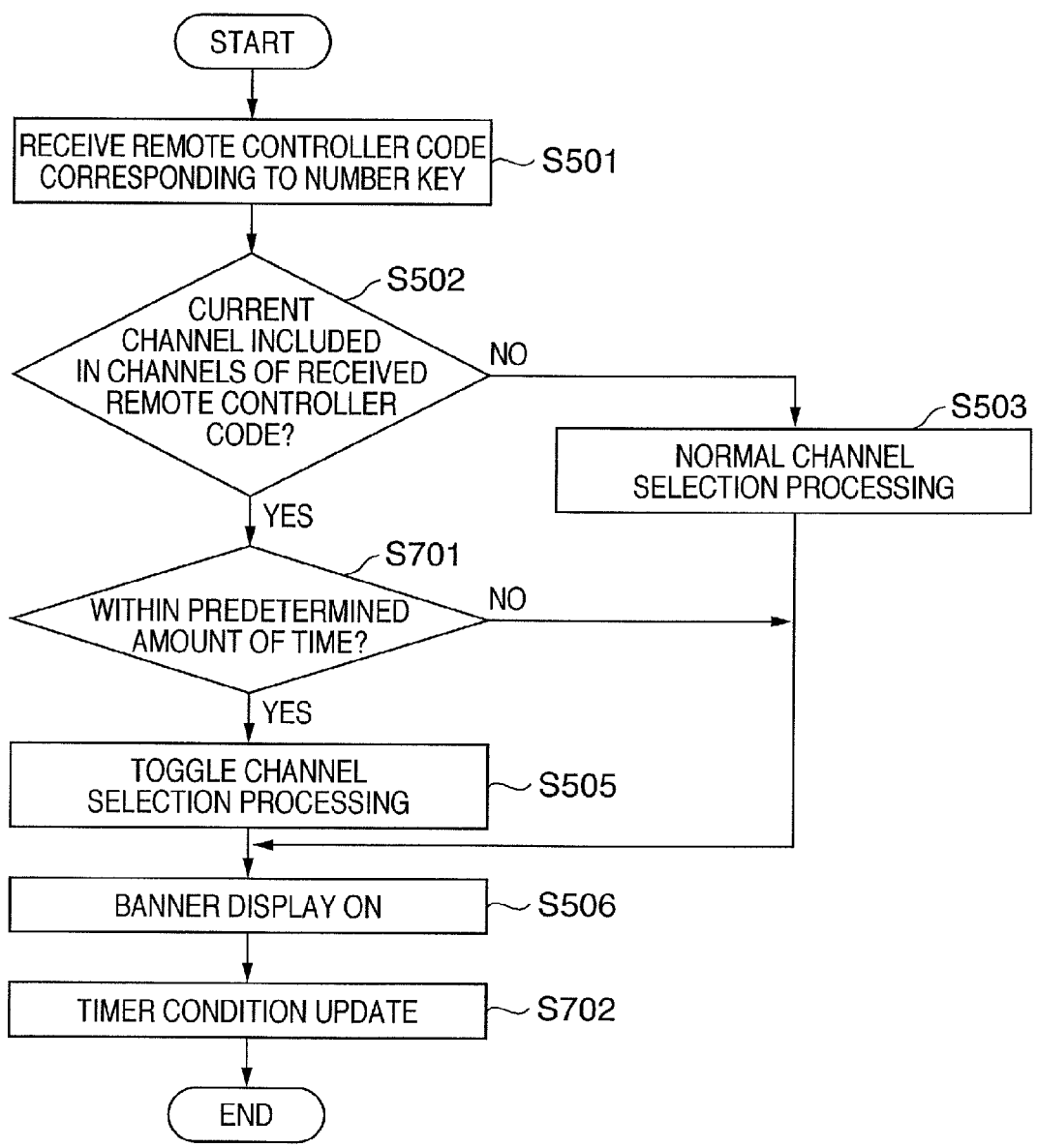
FIG. 7 is a flowchart illustrating a channel selection processing flow in the digital television according to the second embodiment.

FIG. 7 is a flowchart illustrating a channel selection processing flow in the digital television 600 according to the second embodiment. In FIG. 7, steps performing identical processing to those in FIG. 5 are given identical reference numbers, and descriptions thereof are omitted herein.

In step S701, the toggle channel selection execution determination unit 113 determines whether a predetermined condition is met. In the present embodiment, the toggle channel selection execution determination unit 113 determines whether the amount of time that has elapsed from the last channel selection or from the banner display is within a predetermined amount of time based on the notification from the timer unit 115. When the amount of elapsed time is within the predetermined amount of time, toggle channel selection execution is possible, and the procedure proceeds to step S505. When the amount of elapsed time is not within the predetermined amount of time, toggle channel selection execution is not possible, and the procedure proceeds to step S506.

In step S702, the toggle channel selection execution determination unit 113 instructs the timer unit 115 to reset the measurement, and the timer unit 115 commences measurement of the elapsed time from that point in time. When a predetermined amount of time has elapsed after commencing the measurement, the timer unit 115 notifies the toggle channel selection execution determination unit 113 of the time elapse. Accordingly, in step S701, the toggle channel selection execution determination unit 113 can determine whether the amount of time that has elapsed is within the predetermined amount of time.

As described above, according to the present embodiment, the digital television 600 selectively executes the banner display and toggle channel selection based on the amount of time that has elapsed after channel selection instead of the condition of the banner display.

For example, a case can be considered in which the digital television 600 receives a remote controller code identical to the remote controller code corresponding to the currently selected channel immediately after the banner display has disappeared. According to the second embodiment, the digital television 600 can be configured to execute toggle channel selection in such a case as well, as long as it is carried out before the predetermined amount of time has elapsed. Accordingly, it is possible to more flexibly set the standard for selection of banner display and toggle channel selection.

[Third Embodiment]

In the first embodiment, the digital television selectively executes the banner display and the toggle channel selection based on the presence/absence of the banner display. In a third embodiment, the digital television selectively executes the banner display and the toggle channel selection based on the details displayed in the display unit 107 rather than the presence/absence of the banner display. The characters displayed in the display unit 107 are not only from the banner display, but include, for example, characters of a program chart displayed in response to the program chart key 206 of the remote controller 200 being depressed.

Note that in the present embodiment, the configuration of the remote controller 200 is the same as in the first embodiment, and therefore descriptions thereof are omitted herein.

Figure 8:
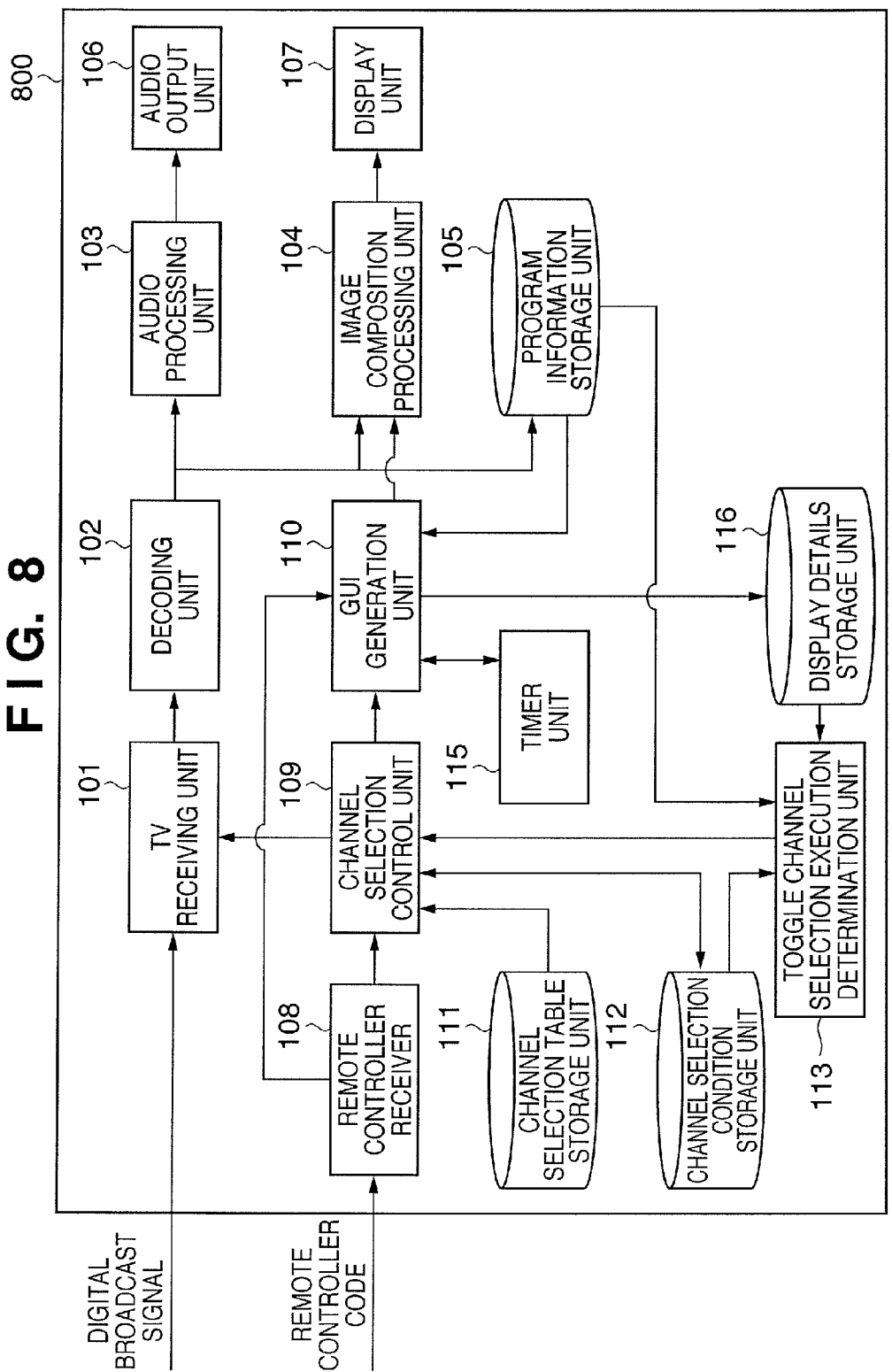
FIG. 8 is a block diagram illustrating a schematic configuration of a digital television according to a third embodiment of the present invention.

FIG. 8 is a block diagram illustrating a schematic configuration of a digital television 800 according to the third embodiment. The digital television 800 has a configuration identical to the digital television 100 illustrated in FIG. 1, except that the displaying condition storage unit 114 has been removed and a display details storage unit 116 has been added in its place. In addition, the toggle channel selection execution determination unit 113 can obtain various information from the channel selection condition storage unit 112, the program information storage unit 105, etc.

The display details storage unit 116 stores information regarding the display details of the display unit 107. The information stored in the display details storage unit 116, hereinafter referred to as "display detail information" is updated each time the GUI generated and output by the GUI generation unit 110 changes.

Figure 9:
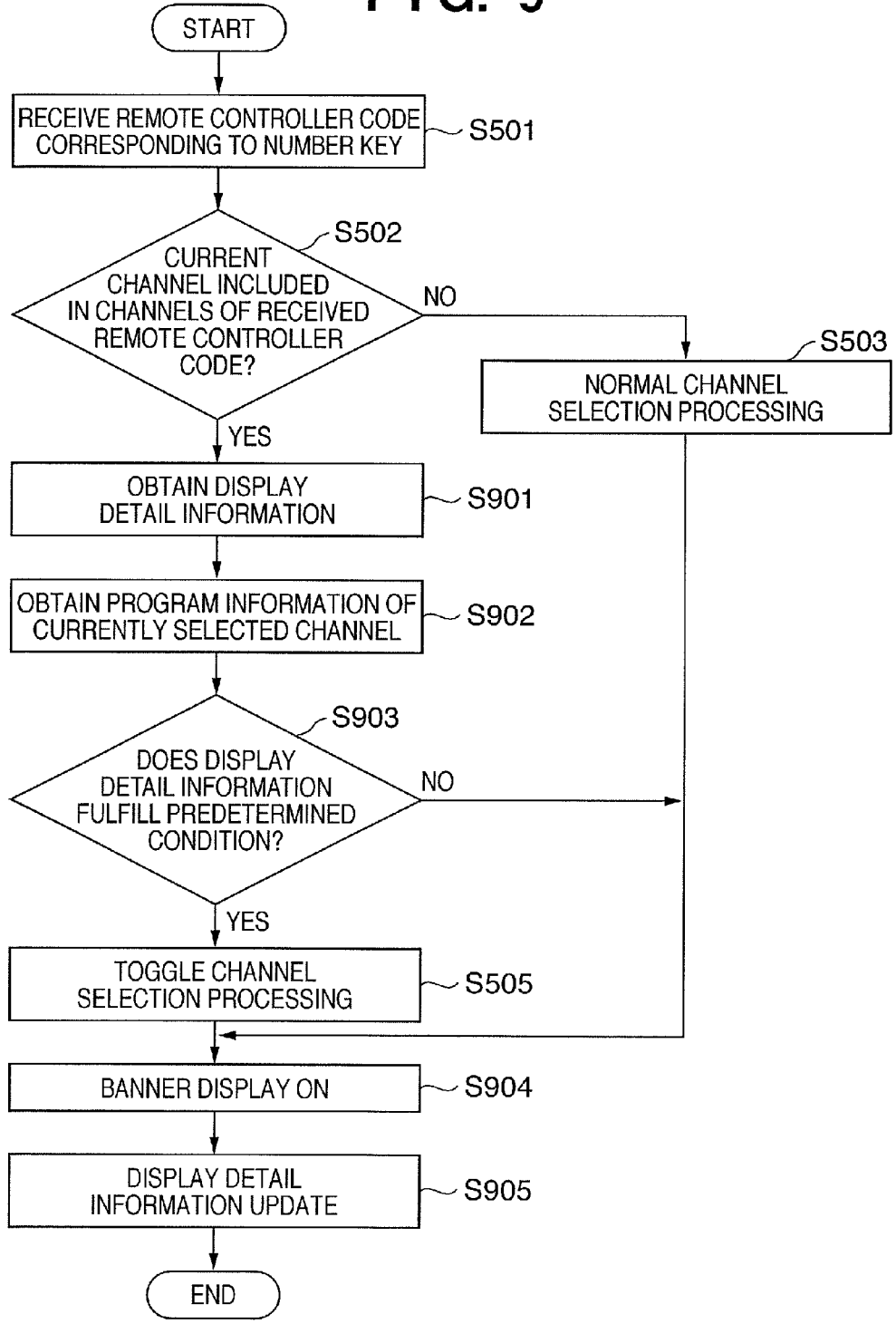
FIG. 9 is a flowchart illustrating a channel selection processing flow in the digital television according to the third embodiment.

FIG. 9 is a flowchart illustrating a channel selection processing flow in the digital television 800 according to the third embodiment. In FIG. 9, steps performing identical processing to those in FIG. 5 are given identical reference numbers, and descriptions thereof are omitted herein.

In step S901, the toggle channel selection execution determination unit 113 obtains the display detail information from the display details storage unit 116. In step S902, the toggle channel selection execution determination unit 113 obtains the program information of the currently selected channel from the program information storage unit 105.

In step S903, the toggle channel selection execution determination unit 113 determines whether the display detail information fulfills a predetermined condition. When the predetermined condition is fulfilled, toggle channel selection execution is possible, and the procedure proceeds to step S505. When the predetermined condition is not fulfilled, toggle channel selection execution is not possible, and the procedure proceeds to step S904. Details regarding the determination in step S903 are described below with reference to FIG. 10.

In step S904, the channel selection control unit 109 makes an instruction to the GUI generation unit 110 regarding the generation of the banner display for the currently selected program. Upon receiving the generation instruction, the GUI generation unit 110 obtains the information regarding the currently selected program from the program information storage unit 105, and generates a banner display GUI.

The generated GUI is sent to the image composition processing unit 104, where it is synthesized with the video data, and then displayed in the display unit 107. The details and size of the characters used in the banner display displayed in step S904 fulfill the condition of step S903 (steps S1002 and S1003 of FIG. 10). In addition, in the case where another banner display is already being displayed, the other banner display may be removed, or the new banner display fulfilling the condition of step S903 may be superimposed over the other banner display and displayed. In step S905, the GUI generation unit 110 updates the display detail information stored in the display details storage unit 116.

Figure 10:
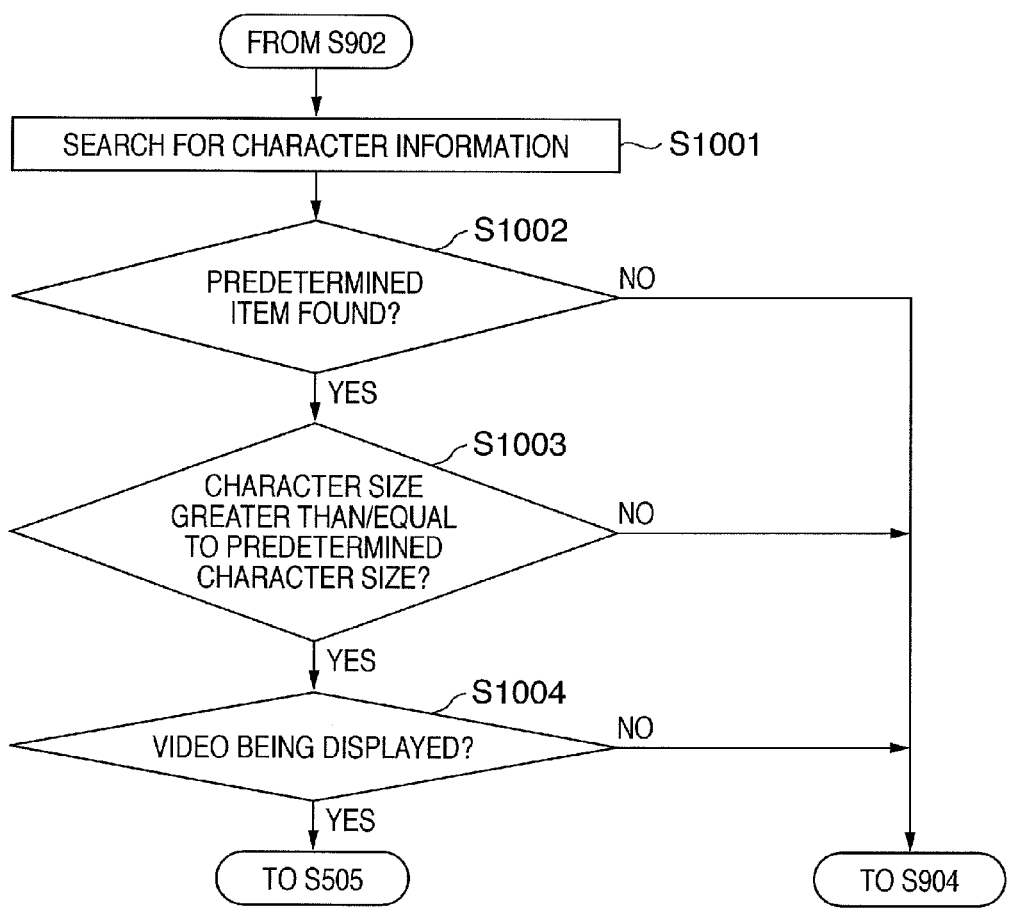
FIG. 10 is a flowchart illustrating details of determination processing occurring in step S903 of FIG. 9.

FIG. 10 is a flowchart illustrating details of determination processing occurring in step S903 of FIG. 9.

In step S1001, the toggle channel selection execution determination unit 113 searches for characters, from among character information included in the display detail information obtained in step S901, indicating the program information obtained in step S902 More specifically, the toggle channel selection execution determination unit 113 searches for the program name, broadcast time, channel number, etc.

In step S1002, the toggle channel selection execution determination unit 113 determines whether a predetermined item has been found in step S1001. In the case where the predetermined item has been found, the procedure proceeds to step S1003. In the case where the predetermined item has not been found, it is determined that toggle channel selection can not be performed, and the procedure proceeds to step S904. The predetermined item may be, for example, just the program name, or three items, i.e. the program name, broadcast time, and channel number.

In step S1003, the toggle channel selection execution determination unit 113 refers to the display detail information and determines whether the size of the characters, which indicates the predetermined item of step S1002, is greater than or equal to a predetermined size. When the size is greater than or equal to the predetermined size, the procedure proceeds to step S1004. When the size is less than the predetermined size, it is determined that the toggle channel selection can not be performed, and the procedure proceeds to step S904.

In step S1004, the toggle channel selection execution determination unit 113 refers to the display detail information and determines whether the decoding unit 102 is displaying the image data included in the currently selected channel in the display unit 107 through the image composition processing unit 104. When the data is being displayed, it is determined that toggle channel selection can be performed, and the procedure proceeds to step S505. When the data is not being displayed, it is determined that the toggle channel selection can not be performed, and the procedure proceeds to step S904.

As described above, in step S903, it is determined whether characters indicating a predetermined item, such as a program name, are included in the display details displayed in the display unit 107, whether the character size is a predetermined size, and whether video is being displayed. However, this is just example of what the determination can be based on.

In general, the toggle channel selection execution determination unit 113 determines whether toggle channel selection can be performed based on whether the presence/absence of video output fulfills a predetermined condition and whether the details being displayed are in a predetermined format. Accordingly, for example, the basis of the determination may be the video format, the audio mode (stereo or monaural), display position of the characters, etc.

In addition, details displayed by a data broadcast browser (not shown) may be a basis of the determination. For example, the toggle channel selection can be disabled when a data broadcast screen is being displayed and can be enabled when the data broadcast screen is not being displayed, or vice versa. In such a case, the display details storage unit 116 is notified of the character information being displayed in the data broadcast screen by the data broadcast browser (not shown).

Note that whether the decoding unit 102 causes the image data included in the currently selected channel to be displayed in the display unit 107 through the image composition processing unit 104 can be switched, for example, by a video display button (not shown) of the remote controller 200.

As described thus far, according to the present embodiment, the digital television 800 selectively executes the banner display and toggle channel selection based on the display details of the display unit 107. Accordingly, it is possible to more flexibly set the standard for selection of banner display and toggle channel selection. More specifically, when information useful for the user to understand the details of the program being broadcasted, such as a program chart, is being displayed, it is possible to set the basis of selection so that toggle channel selection is carried out, even when a banner display such as that illustrated in FIG. 4 is not being displayed.

The basis of selection in the present embodiment is not limited to the banner display, and any basis of selection that would enable practice of the present invention is applicable.

Other Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium include but is not limited to a floppy disk, a hard disk, an optical disk, a magneto-optical disk and the like can be used for providing the program codes. Also, CD-ROM, CD-R, a magnetic tape, a non-volatile memory card, ROM, etc.

The functions according to the above embodiments are realized not only by executing the program codes read by the computer. The present invention also includes a case where an OS (operating system) working on the computer performs part or the entire processes in accordance with designations of the program codes and realizes the functions according to the above embodiments.

The program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-236761, filed on Aug. 31, 2006, which is hereby incorporated by reference herein in its entirety.

What is claimed is:

1. A broadcast receiving apparatus, comprising:
   a selection unit configured to select a channel from a plurality of channels included in a broadcast signal;
   an operation unit configured to output, in response to one of number keys of a remote controller being depressed, key-code information corresponding to the depressed number key;
   a first output unit configured to output video of the channel selected by the selection unit to a display device;
   a second output unit configured to output, in response to a channel selection by the selection unit, channel information including the channel number of the channel selected by the selection unit to the display device until a predetermined amount of time elapses;
   a determination unit configured to determine whether or not the second output unit is outputting the channel information if the key-code information which is identical with the key-code information associated with the channel currently selected by the selection unit is output from the operation unit; and
   a control unit configured to, if the key-code information which is identical with the key-code information associated with the channel currently selected by the selection unit is output from the operation unit:
   (a) cause the selection unit to select one other channel that has been in advance assigned to the key-code information associated with said currently selected channel if it is determined by the determination unit that the second output unit is outputting the channel information, and
   (b) cause the second output unit to output the channel information of said currently selected channel if it is determined by the second determination unit that the second output unit is not outputting the channel information, with causing the selection unit to continue to select said currently selected channel,
   wherein, in the case where the control unit causes the selection unit to select one other channel that has been in advance assigned to the key-code information associated with said currently selected channel, the control unit causes the selection unit to select one of a plurality of other channels that have been in advance assigned to said key-code information in accordance with a predetermined order of the plurality of other channels.

2. The broadcast receiving apparatus according to claim 1, wherein, after causing the selection unit to select the one other channel, the control unit causes the second output unit to output the channel information of the one other channel selected by the selection unit.

3. The broadcast receiving apparatus according to claim 1, wherein the broadcast signal is at least one of a terrestrial analog broadcast, terrestrial digital broadcast, BS analog broadcast, BS digital broadcast, CS analog broadcast, or CS digital broadcast.

4. A broadcast receiving apparatus comprising:
   a selection unit configured to select a channel from a plurality of channels included in a broadcast signal;
   an operation unit configured to output, in response to one of number keys of a remote controller being depressed, key-code information corresponding to the input number key of a remote controller;
   a first output unit configured to output video of the channel selected by the selection unit to a display device;
   a second output unit configured to output, in response to a channel selection by the selection unit, channel information including the channel number of the channel selected by the selection unit to the display device until a predetermined amount of time elapses;
   a determination unit configured to determine whether or not the second output unit is outputting the channel information using characters whose size is larger than a predetermined size if the key-code information which is identical with the key-code information associated with the channel currently selected by the selection unit is output from the operation unit; and
   a control unit configured to, if the key-code information which is identical with the key-code information associated with the channel currently selected by the selection unit is output from the operation unit:
   (a) cause the selection unit to select one other channel that has been in advance assigned to the key-code information associated with said currently selected channel it is determined by the determination unit that if the second output unit is outputting the channel information using characters whose size is larger than a predetermined size, and
   (b) cause the second output unit to output the channel information of said currently selected channel if it is determined by the determination unit that the second output unit is not outputting the channel information using characters whose size is larger than the predetermined size, with causing the selection unit to continue to select said currently selected channel,
   wherein, in the case where the control unit causes the selection unit to select one other channel that has been in advance assigned to the key-code information associated with said currently selected channel, the control unit causes the selection unit to select one of a plurality of other channels that have been in advance assigned to said key-code information in accordance with a predetermined order of the plurality of other channels.

5. A method for controlling a broadcast receiving apparatus, the method comprising:
   selecting a channel from a plurality of channels included in a broadcast signal;
   outputting, in response to one of number keys of a remote controller being depressed, key-code information corresponding to the depressed number key;
   outputting video of the channel selected from the plurality of channels to a display device;
   outputting, in response to a channel selection by the selection unit, channel information including the channel number of the channel selected from the plurality of channels to the display device until a predetermined amount of time elapses;
   determining whether or not the outputting the channel information if the key-code information which is identical with the key-code information associated with the channel currently selected by the selecting is output from the outputting the key-code information; and
   controlling, if the key-code information which is identical with the key-code information associated with the channel currently selected in the step of selecting is output in the step of outputting key-code information:
   (a) the step of selecting to select one other channel that has been in advance assigned to the key-code information associated with said currently selected channel if it is determined in the step of outputting is outputting the channel information, and (b) the step of outputting channel information to output the channel information of said currently selected channel if it is determined in the step of outputting channel information is not outputting the channel information, with causing the selecting to continue to select said currently selected channel, wherein, in the case where the step of controlling controls the step of selecting to select one other channel that has been in advance assigned to the key-code information associated with said currently selected channel, the step of controlling controls the step of selecting to select one of a plurality of other channels that have been in advance assigned to said key-code information in accordance with a predetermined order of the plurality of other channels.

6. The method according to claim 5, wherein, after controlling the step of selecting to select the one other channel, the step of controlling controls the step of outputting channel information to output the channel information of the one other channel.

7. A non-transitory computer-readable storage medium on which is stored a program that causes a computer to execute the method according to claim 5.

8. A method for controlling a broadcast receiving apparatus, the method comprising:

selecting a channel from a plurality of channels included in a broadcast signal;

outputting, in response to one of number keys of a remote controller being depressed, key-code information corresponding to the depressed number key;

outputting video of the channel selected from the plurality of channels to a display device;

outputting, in response to a channel selection by the selecting, channel information including the channel number of the channel selected from the plurality of channels to the display device until a predetermined amount of time elapses;

determining whether or not the outputting the channel information if the key-code information which is identical with the key-code information associated with the channel currently selected by the selecting is output from the outputting the key-code information; and controlling, when if the key-code information which is identical with the key-code information associated with the channel currently selected in the step of selecting is output in the step of outputting key-code information:

(a) the step of selecting to select one other channel that has been in advance assigned to the key-code information associated with said currently selected channel if it is determined in the step of outputting is outputting the channel information using characters whose size is larger than a predetermined size, and (b) the step of outputting channel information to output the channel information of said currently selected channel if it is determined in the step of outputting channel information is not outputting the channel information using characters whose size is larger than a predetermined size, with causing the selecting to continue to select said currently selected channel, wherein, in the case where the step of controlling controls the step of selecting to select one other channel that has been in advance assigned to the key-code information associated with said currently selected channel, the step of controlling controls the step of selecting to select one of a plurality of other channels that have been in advance assigned to said key-code information in accordance with a predetermined order of the plurality of other channels.

9. A broadcast receiving apparatus, comprising:

a selection unit configured to select a channel from a plurality of channels included in a broadcast signal;

a receiving unit configured to receive, in a case where one of number keys of a remote controller being depressed, key-code information corresponding to the depressed number key;

a first output unit configured to output video of the channel selected by the selection unit to a display device;

a second output unit configured to output, in response to a channel selection by the selection unit, channel information including the channel number of the channel selected by the selection unit to the display device until a predetermined amount of time elapses; and a control unit configured to, if key-code information which is identical with the key-code information associated with the channel currently selected by the selection unit is received by the receiving unit:

(a) cause the selection unit to select one other channel that has been in advance assigned to the key-code information associated with said currently selected channel, if the second output unit is outputting the channel information, and (b) cause the second output unit to output the channel information of said currently selected channel, if the second output unit is not outputting the channel information, with causing the selection unit to continue to select said currently selected channel, wherein, in the case where the control unit causes the selection unit to select one other channel that has been in advance assigned to the key-code information associated with said currently selected channel, the control unit causes the selection unit to select one of a plurality of other channels that have been in advance assigned to said key-code information in accordance with a predetermined order of the plurality of other channels.

10. The broadcast receiving apparatus according to claim 9, wherein, after causing the selection unit to select the one other channel, the control unit causes the second output unit to output the channel information of the one other channel selected by the selection unit.

11. The broadcast receiving apparatus according to claim 9, wherein the broadcast signal is at least one of a terrestrial analog broadcast, terrestrial digital broadcast, BS analog broadcast, BS digital broadcast, CS analog broadcast, or CS digital broadcast.

12. A method for controlling a broadcast receiving apparatus, the method comprising:

selecting a channel from a plurality of channels included in a broadcast signal;

receiving, in a case where one of number keys of a remote controller being depressed, key-code information corresponding to the depressed number key;

outputting video of the channel selected from the plurality of channels to a display device;

outputting, in response to a channel selection by the selection unit, channel information including the channel number of the channel selected from the plurality of channels to the display device until a predetermined amount of time elapses; and controlling, if key-code information which is identical with the key-code information associated with the channel currently selected in the step of selecting is received in the step of receiving key-code information:

(a) the step of selecting to select one other channel that has been in advance assigned to the key-code information associated with said currently selected channel, if in the step of outputting is outputting the channel information, and (b) the step of outputting channel information to output the channel information of said currently selected channel, if in the step of outputting channel information is not outputting the channel information, with causing the selecting to continue to select said currently selected channel, wherein, in the case where the step of controlling controls the step of selecting to select one other channel that has been in advance assigned to the key-code information associated with said currently selected channel, the step of controlling controls the step of selecting to select one of a plurality of other channels that have been in advance assigned to said key-code information in accordance with a predetermined order of the plurality of other channels.

13. The method according to claim 12, wherein, after controlling the step of selecting to select the one other channel, the step of controlling controls the step of outputting channel information to output the channel information of the one other channel.

14. The method according to claim 12, wherein the broadcast signal is at least one of a terrestrial analog broadcast, terrestrial digital broadcast, BS analog broadcast, BS digital broadcast, CS analog broadcast, or CS digital broadcast.

15. A non-transitory computer-readable storage medium on which is stored a program that causes a computer to execute the method according to claim 12.

* * * * *